United States Patent
Koyama et al.

(10) Patent No.: US 10,684,672 B2
(45) Date of Patent: Jun. 16, 2020

(54) SELECTION OF A LOW POWER CONSUMPTION MODE IN A MEMORY SYSTEM BASED ON INFORMATION ON A DATA TRANSFER STATE

(71) Applicant: TOSHIBA MEMORY CORPORATION, Tokyo (JP)

(72) Inventors: Junji Koyama, Yokohama Kanagawa (JP); Kenji Ichihara, Kawasaki Kanagawa (JP); Keizo Ikeda, Yokohama Kanagawa (JP); Junichi Mishima, Yokohama Kanagawa (JP); Yosuke Yamahara, Kawasaki Kanagawa (JP); Takashi Yamaguchi, Yokohama Kanagawa (JP); Takuya Sekine, Yokohama Kanagawa (JP); Akinori Bito, Yokohama Kanagawa (JP); Yoshiki Yasui, Shinagawa Tokyo (JP); Ken Okuyama, Yokohama Kanagawa (JP); Yoshinori Shigeta, Kunitachi Tokyo (JP)

(73) Assignee: TOSHIBA MEMORY CORPORATION, Tokyo (JP)

(*) Notice: Subject to any disclaimer, the term of this patent is extended or adjusted under 35 U.S.C. 154(b) by 186 days.

(21) Appl. No.: 15/907,285

(22) Filed: Feb. 27, 2018

(65) Prior Publication Data
US 2019/0086995 A1    Mar. 21, 2019

(30) Foreign Application Priority Data
Sep. 21, 2017  (JP) .................. 2017-180927

(51) Int. Cl.
G06F 1/00         (2006.01)
G06F 1/3296      (2019.01)
(Continued)

(52) U.S. Cl.
CPC ............. *G06F 1/3296* (2013.01); *G06F 1/10* (2013.01); *G06F 1/3225* (2013.01);
(Continued)

(58) Field of Classification Search
None
See application file for complete search history.

(56) References Cited

U.S. PATENT DOCUMENTS

| 9,760,149 B2 | 9/2017 | Park et al. |
| 2003/0013503 A1* | 1/2003 | Menard ............... H04M 1/0291 455/569.2 |

(Continued)

FOREIGN PATENT DOCUMENTS

| JP | 2016-507826 A | 3/2016 |
| JP | 2017-49965 A | 3/2017 |
| WO | 2015/194033 A1 | 12/2015 |

*Primary Examiner* — Nitin C Patel
(74) *Attorney, Agent, or Firm* — Kim & Stewart LLP

(57) ABSTRACT

A memory system includes a nonvolatile semiconductor memory, and a controller circuit that includes a physical layer and is configured to store information defining a plurality of low power consumption modes for setting the physical layer to a low power consumption state while controlling the physical layer according to a first standard, and control input and output of signals between the physical layer and the nonvolatile semiconductor memory according to a second standard. The controller circuit selects one of the low power consumption modes based on a data transfer state of the physical layer.

20 Claims, 5 Drawing Sheets

(51) Int. Cl.
   *G06F 1/10*      (2006.01)
   *G06F 13/42*     (2006.01)
   *G06F 1/3225*    (2019.01)
   *G06F 1/3234*    (2019.01)
   *G06F 1/3287*    (2019.01)
   *G06F 1/3237*    (2019.01)

(52) U.S. Cl.
   CPC .......... *G06F 1/3237* (2013.01); *G06F 1/3275* (2013.01); *G06F 1/3287* (2013.01); *G06F 13/4282* (2013.01)

(56) References Cited

U.S. PATENT DOCUMENTS

| | | | |
|---|---|---|---|
| 2010/0115316 A1* | 5/2010 | Diab | H04L 12/12 713/323 |
| 2010/0275037 A1* | 10/2010 | Lee | G06F 13/385 713/189 |
| 2015/0012671 A1* | 1/2015 | Park | G06F 1/3268 710/5 |
| 2017/0060208 A1 | 3/2017 | Sawai et al. | |
| 2017/0102874 A1 | 4/2017 | Ouchi et al. | |
| 2017/0177219 A1* | 6/2017 | Lee | G06F 3/0659 |
| 2018/0359257 A1* | 12/2018 | Dubman | H04L 12/2825 |

\* cited by examiner

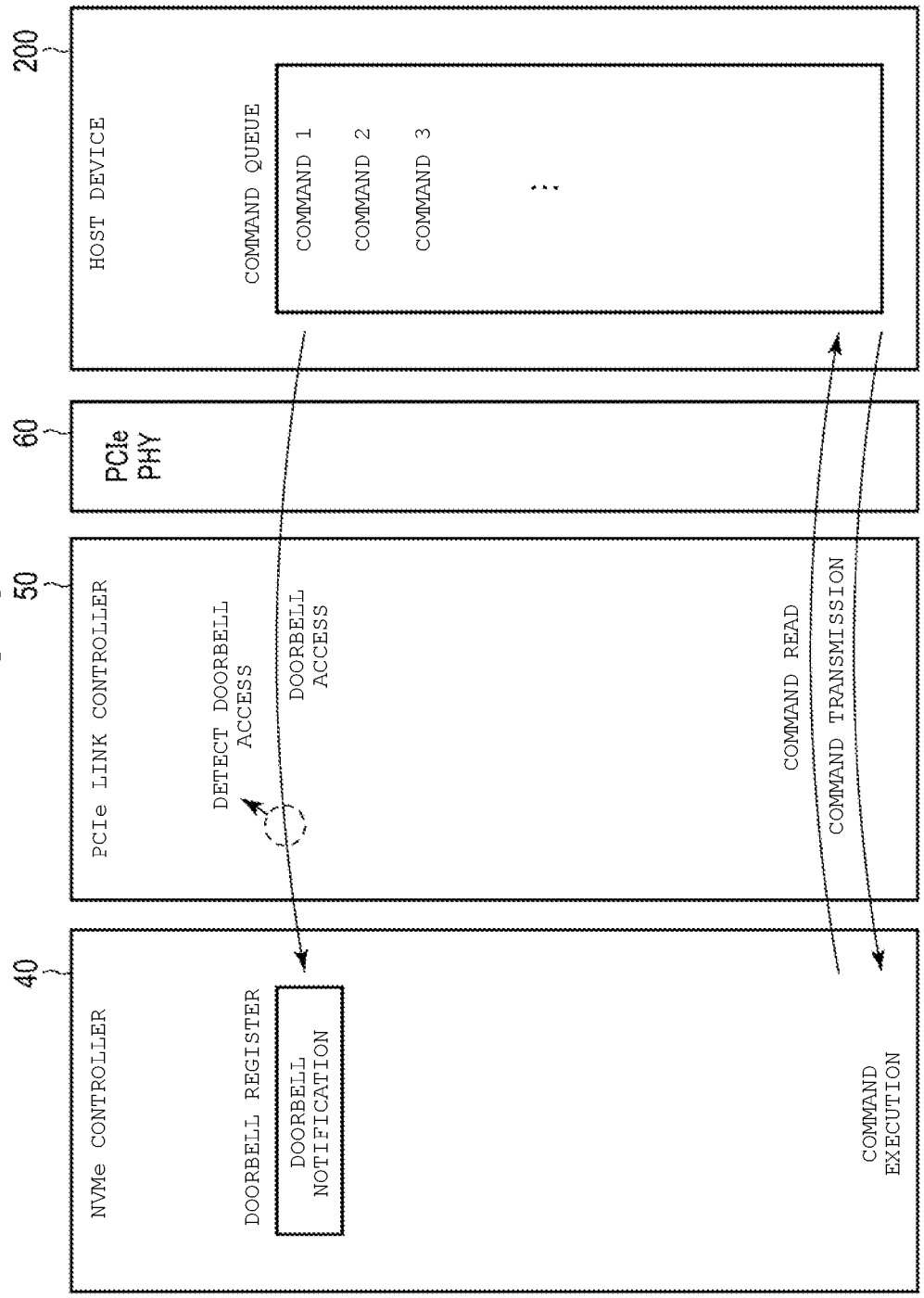

SELECTION OF A LOW POWER CONSUMPTION MODE IN A MEMORY SYSTEM BASED ON INFORMATION ON A DATA TRANSFER STATE

This application is based upon and claims the benefit of priority from Japanese Patent Application No. 2017-180927, filed Sep. 21, 2017, the entire contents of which are incorporated herein by reference.

FIELD

Embodiments described herein relate generally to a memory system, a method of controlling the memory system, and a controller circuit.

BACKGROUND

A solid state drive (SSD) mounted with nonvolatile semiconductor memory such as NAND-type flash memory is known. The SSD is used, for example, as an external storage device of various computers.

DESCRIPTION OF THE DRAWINGS

FIG. 5 is a diagram illustrating a state of signal transmission/reception between an NVMe controller and a host device according to a second embodiment.

DETAILED DESCRIPTION

Embodiments provide a memory system capable of improving power consumption performance, a method of controlling the memory system, and a controller circuit.

In general, according to one embodiment, a memory system includes a nonvolatile semiconductor memory, and a controller circuit that includes a physical layer and is configured to store information defining a plurality of low power consumption modes for setting the physical layer to a low power consumption state while controlling the physical layer according to a first standard, and controls input and output of signals between the physical layer and the nonvolatile semiconductor memory according to a second standard. The controller circuit selects one of the low power consumption modes based on a data transfer state of the physical layer.

Embodiments will be described below with reference to the drawings. In the following description, the components having the same function and configuration are given the same reference signs. In addition, devices and methods to embody technical ideas of the embodiments will be described below as examples, and materials, shapes, structures, and arrangements of the components are not limited to those examples given in the following description.

Each functional block may be implemented in hardware or computer software, or a combination thereof. Each functional block is not limited by the following examples. For example, some functions may be executed by a functional block different from the functional block depicted below. Further, the functional block depicted below may be subdivided into smaller functional blocks.

[1] First Embodiment

A memory system according to a first embodiment will be described.

[1-1] Configuration of Memory System

Figure 1:
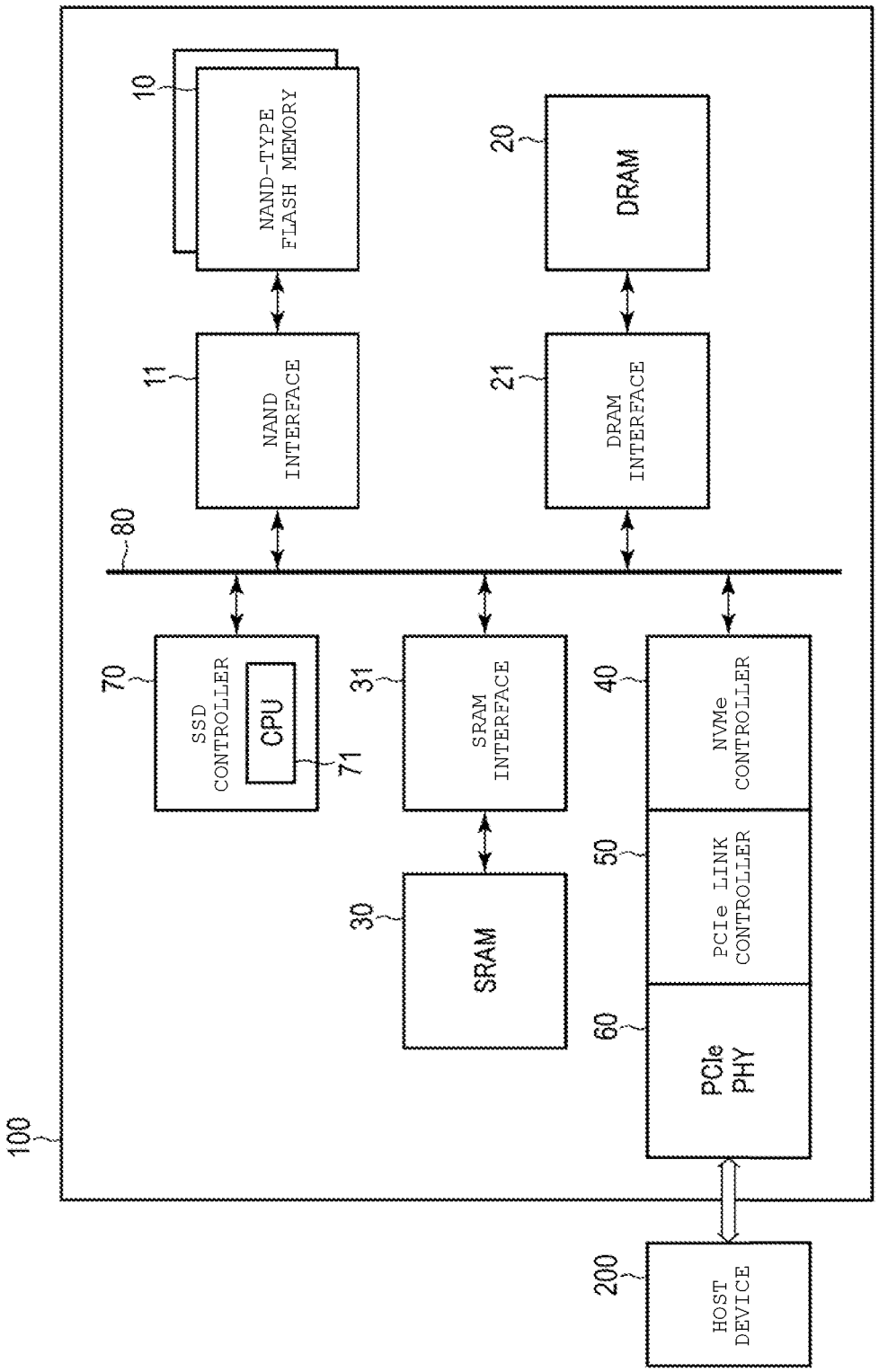
FIG. 1 is a block diagram of a memory system according to a first embodiment.

With reference to FIG. 1, a configuration of the memory system according to the first embodiment will be described. FIG. 1 is a block diagram illustrating the configuration of the memory system according to the first embodiment.

As illustrated in the drawing, a memory system 100 includes a NAND-type flash memory 10, a NAND interface 11, a dynamic random access memory (DRAM) 20, a DRAM interface 21, a static random access memory (SRAM) 30, an SRAM interface 31, a non-volatile memory express (NVMe®) controller 40, a peripheral component interconnect express (PCIe®) link controller 50, a PCIe physical layer (PCIePHY) 60, and an SSD controller 70.

The NAND interface 11, the DRAM interface 21, the SRAM interface 31, the NVMe controller 40, and the SSD controller 70 are connected to each other through a bus 80 such that signals can be mutually transmitted and received. In addition, a host device 200, which may be, for example, various computers, is connected to the PCIePHY 60.

One or any number of NAND-type flash memory 10 is included. The NAND-type flash memory 10 is a nonvolatile memory that stores data in memory cells. A memory cell array of the NAND-type flash memory 10 will be described in detail below. The NAND interface 11 is connected to the NAND-type flash memory 10, and communicates with the NAND-type flash memory 10. Instead of the NAND-type flash memory 10, another type of nonvolatile semiconductor memory, for example, a magnetoresistive random access memory (MRAM) or a ferroelectric random access memory (FeRAM), may be provided.

The DRAM 20 and the SRAM 30 are each volatile memory that stores data in memory cells. The DRAM interface 21 is connected to the DRAM 20, and communicates with the DRAM 20. The SRAM interface 31 is connected to the SRAM 30, and communicates with the SRAM 30.

The NVMe controller 40 controls, based on the nonvolatile memory express (NVMe) standard, input and output of signals between the host device 200 and the NAND-type flash memory 10 via the PCIePHY 60 and the PCIe link controller 50. The PCIe link controller 50 controls, based on the PCI express (PCIe) standard, input and output of signals between the host device 200 and the PCIePHY 60. The PCIePHY 60 is a physical layer of PCIe, and has a physical connection form that conforms with the PCIe standard.

The SSD controller 70 has a CPU 71, and controls the memory system 100. The SSD controller 70 executes various processing such as encoding, encryption, or randomization on data requested from the host device 200 via the NVMe controller 40 and writes the processed data in the NAND-type flash memory 10 via the NAND interface 11. The SSD controller 70 also reads data, which is requested by the host device 200 via the NVMe controller 40, from the NAND-type flash memory 10 via the NAND interface 11, executes various processing, for example, decoding or error detection and correction on the data, and provides the processed data to the host device 200. In these types of processing, the SRAM 30 is used via the SRAM interface 31, and the DRAM 20 is used via the DRAM interface 21.

Figure 2:
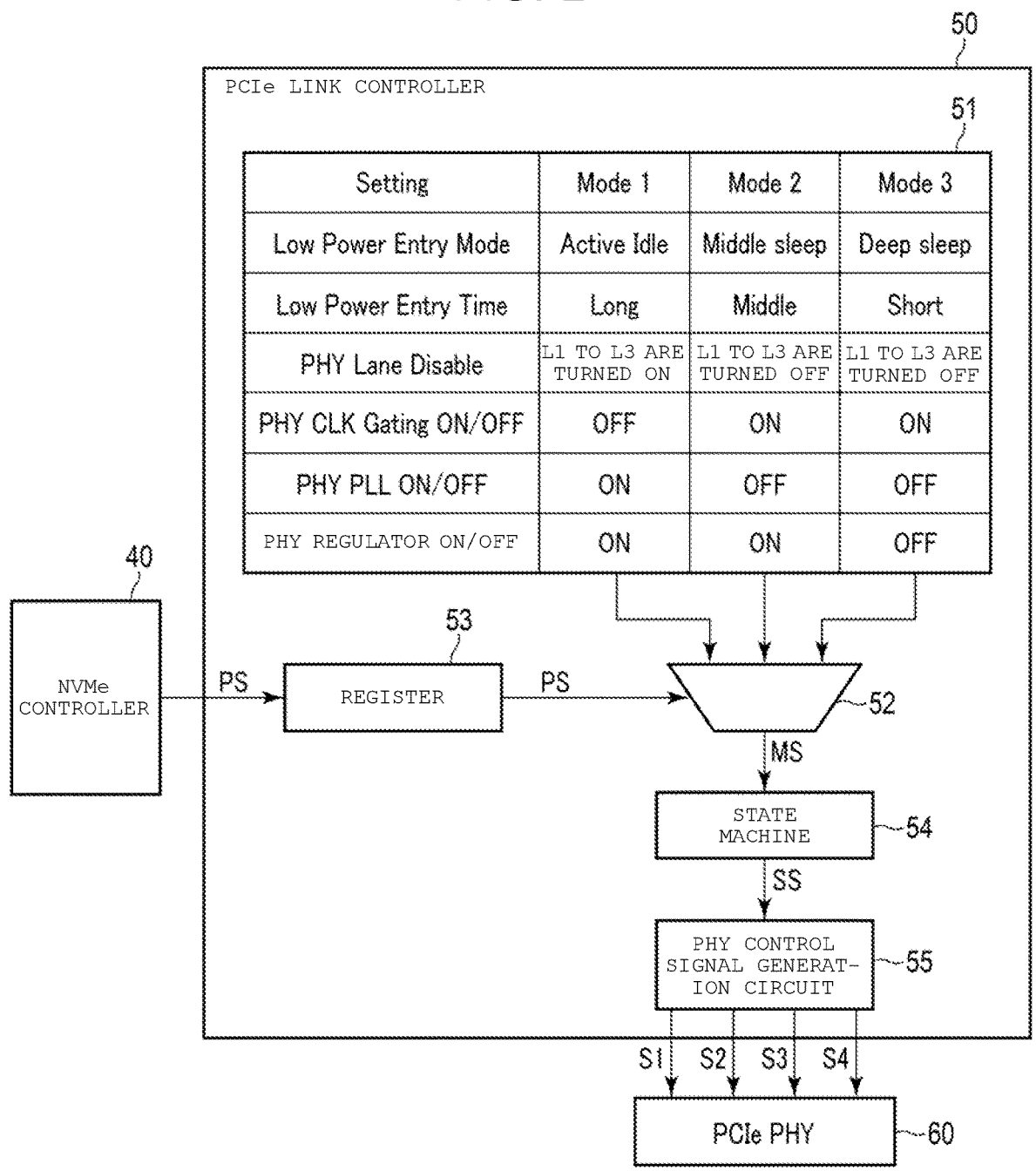
FIG. 2 is a diagram illustrating a detailed configuration of a PCIe link controller in the memory system according to the first embodiment.

Next, a detailed configuration of the PCIe link controller 50 illustrated in FIG. 1 will be described with reference to FIG. 2. FIG. 2 is a diagram illustrating the detailed configuration of the PCIe link controller 50.

As illustrated in the drawing, the PCIe link controller 50 stores an operation table 51. The PCIe link controller 50 includes a multiplexer 52, a register 53, a state machine 54, and a PHY control signal generation circuit 55. The NVMe controller 40 is connected to the register 53. Further, the PHY control signal generation circuit 55 is connected to the PCIePHY 60.

In the operation table 51, a plurality of low power consumption modes to be used in a low power consumption operation in the PCIePHY 60 are defined. Here, as the plurality of low power consumption modes, for example, three modes including Mode 1, Mode 2, and Mode 3 are illustrated. The three modes are illustrated as the low power consumption modes, and the number of modes may be one, two, or four or more. According to the PCIe standard, the PCIePHY 60 is set to the low power consumption mode by power control management called ASPM (Active State Power Management) where there is no data transfer for a certain time period. Mode 1, Mode 2, and Mode 3 assume that the low power consumption mode is used in conformity with an ASPM operation regulation, but a mode not meeting the ASPM operation regulation can also be used.

Modes 1, 2, and 3 are referred to as active idle, middle sleep, and deep sleep, respectively, for example, as low power entry modes. Statuses in the PCIePHY 60 set in Modes 1, 2, and 3 will be described below.

In Mode 1, a low power entry time is long, lanes L1 to L3 are in an ON state, a clock gating circuit is in an OFF state, a PLL is in an ON state, and a regulator is in an ON state.

The OFF state of the clock gating circuit means that a clock gating function is in a stop state. Therefore, when the clock gating circuit is in the OFF state, the clock is output from the clock gating circuit. On the other hand, the ON state of the clock gating circuit means that clock gating function is in an operating state. Therefore, when the clock gating circuit is in the ON state, the clock is stopped by the clock gating circuit.

The ON state of the PLL means that the PLL is in an operating state. Therefore, when the PLL is in the ON state, the clock is generated from the PLL. On the other hand, the OFF state of the PLL means that the PLL is in a stop state. Therefore, when the PLL is in the OFF state, the clock is stopped from the PLL.

The ON state of the regulator means that the regulator is in an operating state. Therefore, when the regulator is in the ON state, a voltage is supplied from the regulator. On the other hand, the OFF state of the regulator means that the regulator is in a stop state. Therefore, when the regulator is in the OFF state, the supply of the voltage from the regulator is stopped.

In Mode 2, the low power entry time is middle, the lanes L1 to L3 are in an OFF state, the clock gating circuit is in an ON state, the PLL is in an OFF state, and the regulator is in an ON state.

In Mode 3, the low power entry time is short, the lanes L1 to L3 are in an OFF state, the clock gating circuit is in an ON state, the PLL is in an OFF state, and the regulator is in an OFF state.

Figure 3:
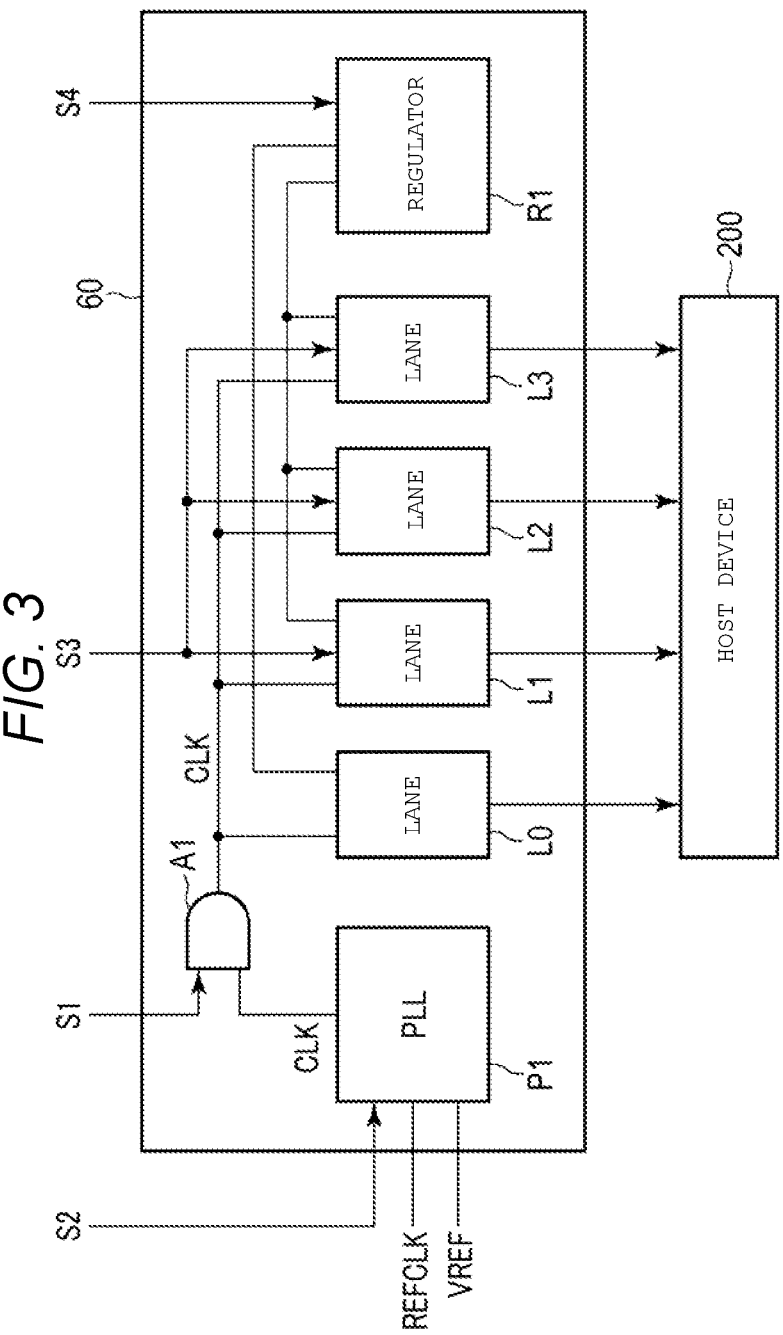
FIG. 3 is a diagram illustrating a part of a PCIePHY circuit in the memory system according to the first embodiment.

The lanes L0 to L3, the clock gating circuit, the PLL, and the regulator will be described later with reference to FIG. 3.

The register 53 stores power state information PS supplied from the NVMe controller 40. The multiplexer 52 selects any one of Mode 1, Mode 2, and Mode 3 based on the power state information PS. Then, the multiplexer 52 outputs a signal MS indicating the selected mode.

The power state information PS is information generated according to the NVMe standard, and is information that changes depending on the data transfer state (for example, data transfer frequency or no transfer) between the host device 200 (through the PCIePHY 60) and the NAND-type flash memory 10. The power state information PS may also include information that is determined by other conditions. Here, the information that changes depending on the data transfer state is used as the power state information PS in this embodiment.

Based on the signal MS received from the multiplexer 52, the state machine 54 determines a state of the circuit in the PCIePHY 60 according to the low power consumption mode selected by the multiplexer 52, and outputs a signal SS indicating the state of the circuit.

The PHY control signal generation circuit 55 decodes the signal SS received from the state machine 54, and generates control signals S1, S2, S3, and S4 for controlling the state in the PCIePHY 60.

A detailed configuration of the PCIePHY 60 will be described below in which the low power consumption operation is performed. FIG. 3 is a diagram illustrating a part of the circuit in the PCIePHY 60.

As illustrated in the drawing, the PCIePHY 60 includes four lanes L0, L1, L2, and L3, a PLL (Phase-Locked Loop) P1, a logical AND circuit (hereinafter, referred to as AND circuit) A1 as a clock gating circuit, and a regulator R1. Here, the case where the PCIePHY 60 includes the four lanes is described, but the embodiment is not limited thereto. There may be cases where the PCIePHY 60 has 1, 2, 8, 16, and 32 or more lanes.

The lanes L0, L1, L2, and L3 are connected to the host device 200, and transmit and receive signals between the PCIePHY 60 and the host device 200. A reference clock REFCLK and a reference voltage VREF are supplied to the PLL P1. The PLL P1 generates a clock CLK used in the PCIePHY 60 from the reference clock REFCLK. The AND circuit A1 supplies the clock CLK to the lanes L0 to L3 or stops the clock CLK. The regulator R1 supplies voltages to the lanes L0 to L3.

The control signals S1, S2, S3, and S4 are supplied to the AND circuit A1, the PLL P1, the lanes L1 to L3, and the regulator R1, respectively, from the PHY control signal generation circuit 55.

Figure 4:
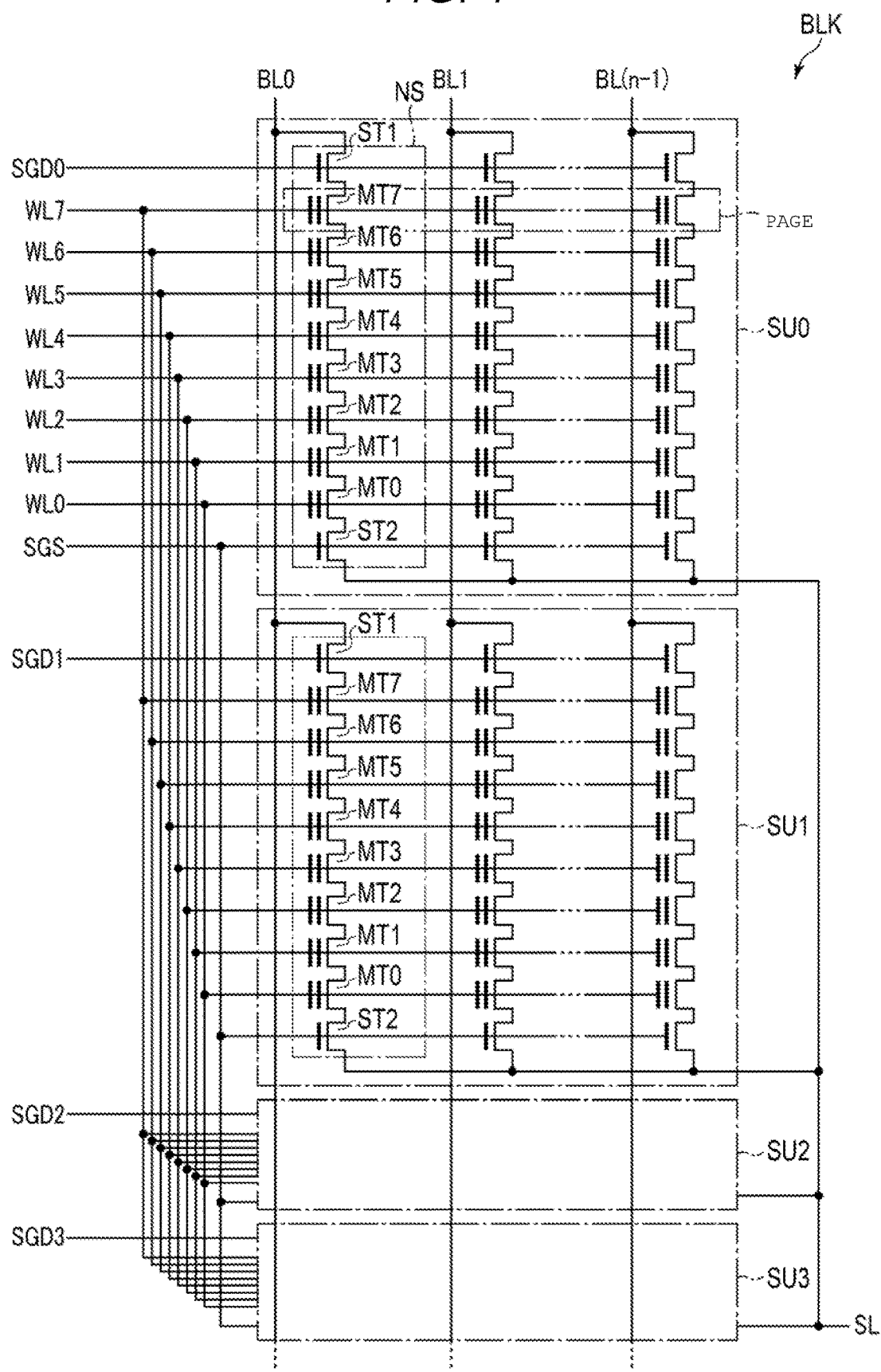
FIG. 4 is a circuit diagram of a memory cell array of a NAND-type flash memory in the memory system according to the first embodiment.

The memory cell array of the NAND-type flash memory 10 will be described below. The NAND-type flash memory has a plurality of blocks BLKs in the memory cell array. FIG. 4 is a circuit diagram of a block BLK in the memory cell array provided in the NAND-type flash memory.

As illustrated in FIG. 4, the block BLK includes, for example, four string units SU0, SU1, SU2, and SU3. In addition, each of the string units includes a plurality of NAND strings NS. Any number of string units SU may be in one block BLK and any number of NAND strings NS may be in one string unit SU. Hereinafter, the string unit SU described herein indicates each of the plurality of string units SU0 to SU3.

Each of the NAND strings NS includes, for example, eight memory cell transistors MT0 to MT7 and select transistors ST1 and ST2. Dummy transistors may be formed between the memory cell transistor MT0 and the select transistor ST2 and between the memory cell transistor MT7 and the select transistor ST1. Hereinafter, a memory cell transistor MT described herein indicates each of the memory cell transistors MT0 to MT7, and a select transistor ST described herein indicates each of the select transistors ST1 and ST2.

The memory cell transistor MT includes a stacked gate including a control gate and a charge storage layer, and stores data in a nonvolatile state. The memory cell transistor MT may be of an MONOS (Metal-Oxide-Nitride-Oxide-Silicon) type using an insulating film as the charge storage layer, or an FG (Floating Gate) type using a conductive film as the charge storage layer. In the first embodiment, the memory cell transistor MT is of the MONOS type. Further, the number of memory cell transistors MT is eight, but may be 16, 32, 64, 128, or any number. Further, any number of select transistors ST1 and ST2 may be provided.

Sources or drains of the memory cell transistors MT0 to MT7 are connected to each other in series between the select transistors ST1 and ST2. A drain of the memory cell transistor MT7, which is one end of the series connection, is connected to a source of the select transistor ST1, and a source of the memory cell transistor MT0, which is the other end thereof, is connected to a drain of the select transistor ST2.

In the string units SU0 to SU3, gates of the select transistors ST1 are connected to select gate lines SGD0, SGD1, SGD2, and SGD3, respectively. Hereinafter, a select gate line SGD described herein indicates each of the select gate lines SGD0 to SGD3. The gates of the select transistors ST1 in the same string unit SU are commonly connected to the same select gate line SGD.

In the string units SU0 to SU3, gates of the select transistors ST2 are connected to a select gate line SGS. The gates of the select transistors ST2 in the same string unit SU are commonly connected to the same select gate line SGS.

The control gates of the memory cell transistors MT0 to MT7 in the same block BLK are commonly connected to word lines WL0 to WL7, respectively.

That is, while the word lines WL0 to WL7 are commonly connected between the plurality of string units SU in the same block BLK, the select gate lines SGD and SGS are independent for each string unit SU within the same block.

Among the NAND strings NS in a matrix configuration in the memory cell array, drains of the select transistors ST1 of the NAND strings NS along the same column are commonly connected to one of bit lines BL0, BL1, . . . , and BL(n−1). Here, n is a natural number of 1 or more. In FIG. 4, the beginning bit line is defined as BL0. A bit line BL described herein indicates each of the bit lines BL0 to BL(n−1). That is, the bit line BL is commonly connected to the NAND strings NS across the plurality of string units SU.

Sources of the select transistors ST2 of the NAND strings NS in the string units SU0 to SU3 are commonly connected to a source line SL.

Data reading and writing are collectively performed for the plurality of memory cell transistors MT commonly connected to any one of the word lines WL in any string unit SU in any block BLK. This unit is called "page".

In addition, the erasure range of data is not limited to one block BLK. However, a plurality of blocks may be erased at one time, or a part of the region in one block BLK may be erased at one time.

[1-2] Low Power Consumption Operation in Memory System

As illustrated in FIG. 2, the PCIe link controller 50 stores the operation table 51 having Mode 1, Mode 2, and Mode 3.

The CPU 71 supplies the PS information to the register in the PCIe link controller 50 when the power state information PS of the NVMe controller 40 has changed. The power state information PS is the information that changes depending on the data transfer state between the host device 200 and the NAND-type flash memory 10.

The multiplexer 52 selects any one of Mode 1, Mode 2, and Mode 3 based on the power state information PS received from the register 53, and outputs the signal MS indicating the selected mode. The case of acquiring the power state information PS using the register 53 is described as an example, and a dedicated signal may be transmitted between the NVMe controller 40 and the PCIe controller 50 and the power state information PS may be acquired with the dedicated signal.

The state machine 54 determines the state of the circuit in the PCIePHY 60 according to the low power consumption mode selected by the multiplexer 52, based on the signal MS received from the multiplexer 52, and outputs the signal SS indicating the state of the circuit.

The PHY control signal generation circuit 55 decodes the signal SS received from the state machine 54, and generates the control signals S1, S2, S3, and S4 for controlling the state in the PCIePHY 60.

Some specific examples of the low power consumption operation performed by the PCIePHY 60 will be described below with reference to FIGS. 2 and 3.

For example, when Mode 2 is selected by the multiplexer 52, the clock gating circuit is set to an ON state. In this case, the control signal S1 is de-asserted by the PHY control signal generation circuit 55, and the control signal S1 in the de-asserted state is output to a first input terminal of the AND circuit A1. The clock CLK is supplied to a second input terminal of the AND circuit Aa from the PLL P1. The AND circuit A1 stops the output of the clock CLK to the lanes L0 to L3 when the control signal S1 is de-asserted.

Similarly, when Mode 2 is selected, the lanes L1 to L3 are set to a disable state. In this case, the control signal S3 is de-asserted by the PHY control signal generation circuit 55, and the control signal S3 in the de-asserted state is output to the lanes L1 to L3. Thus, the lanes L1 to L3 receiving the control signal S3 are disabled.

Similarly, when Mode 2 is selected, the regulator R1 is set to an OFF state. In this case, the control signal S4 is de-asserted by the PHY control signal generation circuit 55, and the control signal S4 in the de-asserted state is output to the regulator R1. Thus, the regulator R1 receiving the control signal S4 is turned off, and the voltage supply to the lanes L0 to L3 is stopped.

When Mode 3 is selected, the PLL P1 is set to an OFF state. In this case, the control signal S2 is de-asserted by the PHY control signal generation circuit 55, and the control signal S2 in the de-asserted state is output to the PLL P1. Thus, the PLL P1 receiving the control signal S2 is turned off, and the generation of the clock is stopped.

[1-3] Effects of First Embodiment

According to the first embodiment, it is possible to provide a memory system capable of improving power consumption performance. In the first embodiment, the PCIe controller 50 selects a suitable mode from the plurality of low power consumption modes set in the operation table in the PCIe controller 50, based on the power state information PS supplied from the NVMe controller 40. Thus, it is possible to set the PCIePHY 60 controlled by the PCIe controller 50 to the optimum low power consumption state according to the operation state (in particular, the data transfer state) of the PCIePHY 60.

[2] Second Embodiment

In a second embodiment, an example is described in which a doorbell access from the host device 200 to the memory system 100 is detected, and the NVMe controller 40 returns from the low power consumption state.

[2-1] Configuration and Operation of Memory System

With reference to FIG. 5, a description will be given about an example of transmission and reception of signals between the NVMe controller 40 and the host device 200 in the memory system 100 according to the second embodiment. FIG. is a diagram illustrating a state of signal transmission/reception between the NVMe controller 40 and the host device 200. A list of command queues is stored in the host device 200. When the command queues are filling up, the doorbell access is performed from the host device 200 to the NVMe controller 40 via the PCIePHY 60 and the PCIe link controller 50. In the second embodiment, the PCIe link controller 50 detects the doorbell access.

An operation of the memory system 100 according to the second embodiment will be described with reference to FIG. 5.

When the command queues are filling up in the host device 200, a doorbell notification is output to a doorbell register in the NVMe controller 40 from the host device 200 via the PCIePHY 60 and the PCIe link controller 50. Upon receiving the doorbell notification, the NVMe controller 40 reads out a command in the host device 200. Then, the command is transmitted from the host device 200 to the NVMe controller 40. Thus, the NVMe controller 40 executes a command operation according to the read command.

In such an operation, the PCIe link controller 50 detects the doorbell access from the host device 200 to the NVMe controller 40, thereby determining the start timing of the data transfer and returning from the low power consumption mode to a normal mode. As a result, the transition from the low power consumption mode to the normal mode at the start of the data transfer becomes faster, and both the low power consumption and the speed-up of read and write operations can be achieved.

The example of detecting the doorbell access from the host device 200 is described herein, but any other examples may be applied. For example, the NVMe controller 40 or the PCIe controller 50 may receive or monitor information on the data transfer state, and the transition from the low power consumption mode to the normal mode may be performed. Other configurations and operations are similar to those of the first embodiment.

[2-3] Effects of Second Embodiment

According to the memory system of the second embodiment, it is possible to accurately and quickly perform the transition from the low power consumption mode to the normal mode by detecting the operation request notification (e.g., doorbell access) from the host device 200. Other effects are similar to those of the first embodiment.

[3] Other Modifications

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
    a nonvolatile semiconductor memory; and
    a controller circuit that includes a physical layer according to a first standard and is configured to store first information defining a plurality of low power consumption modes according to the first standard for setting the physical layer to a low power consumption state while controlling the physical layer according to the first standard, and control input and output of signals between the physical layer and the nonvolatile semiconductor memory according to a second standard, wherein
    the controller circuit is configured to select one of the low power consumption modes according to the first standard, based on the stored first information and second information that varies according to a data transfer state between the physical layer and the nonvolatile semiconductor memory according to the second standard.

2. The memory system according to claim 1, wherein
    the first standard is an I/O interface standard of PCIe (Peripheral Component Interconnect express), and the second standard is an interface standard of NVMe (Non-Volatile Memory express).

3. The memory system according to claim 1, wherein
    the physical layer includes at least one lane for input/output signals, a phase-locked loop (PLL) that generates a clock, a clock gating circuit that gates the clock, and a regulator that supplies a voltage to the lane, and
    the controller circuit sets at least one of the lane, the PLL, the clock gating circuit, and the regulator to an operating state or a stop state according to the selected low power consumption mode.

4. The memory system according to claim 3, wherein
    the plurality of low power consumption modes are designated with at least one of an operating or stop state of the lane in the physical layer, an operating or stop state of the clock gating circuit, an operating or stop state of the PLL, and an operating or stop state of the regulator.

5. The memory system according to claim 1, wherein
    the controller circuit includes a multiplexer that is configured to select the low power consumption mode based on the data transfer state of the physical layer, a control circuit configured to determine a low power consumption state of the physical layer according to the selected low power consumption mode, and a generation circuit configured to generate a control signal for setting the determined low power consumption state.

6. The memory system according to claim 5, wherein
    the physical layer includes at least one lane for input/output signals, a phase-locked loop (PLL) that generates a clock, a clock gating circuit that gates the clock, and a regulator that supplies a voltage to the lane, and the generation circuit is configured to generate a separate control signal for each of the lane for input/output signals, the PLL, the clock gating circuit, and the regulator.

7. The memory system according to claim 6, wherein the controller circuit is connected to a host, detects a doorbell access from the host, and controls the low power consumption mode in response to the detection of the doorbell access.

8. The memory system according to claim 7, wherein the input/output signals are transmitted to the host and received from the host through the at least one lane.

9. The memory system according to claim 8, wherein the data transfer state is a data transfer frequency of the input/output signals that are transmitted to the host and received from the host through the at least one lane.

10. The memory system according to claim 1, wherein the data transfer state is a data transfer frequency of input/output signals through the physical layer.

11. A method of controlling a memory system including a nonvolatile semiconductor memory, the method comprising:
  controlling a physical layer according to a first standard;
  controlling input and output of signals between the physical layer and the nonvolatile semiconductor memory according to a second standard; and
  selecting one of a plurality of low power consumption modes according to the first standard for setting the physical layer to a low power consumption state, based on first information defining the plurality of low power consumption modes according to the first standard and second information that varies according to a data transfer state between the physical layer and the nonvolatile semiconductor memory according to the second standard.

12. The method according to claim 11, wherein the first standard is an I/O interface standard of PCIe (Peripheral Component Interconnect express), and the second standard is an interface standard of NVMe (Non-Volatile Memory express).

13. The method according to claim 11, wherein the physical layer includes at least one lane for input/output signals, a phase-locked loop (PLL) that generates a clock, a clock gating circuit that gates the clock, and a regulator that supplies a voltage to the lane, and the plurality of low power consumption modes are designated with at least one of an operating or stop state of the lane in the physical layer, an operating or stop state of the clock gating circuit, an operating or stop state of the PLL, and an operating or stop state of the regulator.

14. The method according to claim 11, further comprising:
  detecting a doorbell access from a host to which the physical layer is connected; and
  controlling the low power consumption mode in response to the detection of the doorbell access.

15. The method according to claim 14, wherein the data transfer state is a data transfer frequency of input/output signals that are transmitted to the host and received from the host.

16. A controller circuit for a nonvolatile semiconductor memory, comprising:
  a physical layer according to a first standard;
  a first circuit configured to control the physical layer according to the first standard and store first information defining a plurality of low power consumption modes according to the first standard for setting the physical layer to a low power consumption state; and
  a second circuit configured to control input and output of signals between the physical layer and the nonvolatile semiconductor memory according to a second standard, wherein
  the first circuit is configured to select one of the plurality of low power consumption modes according to the first standard based on the stored first information and second information that varies according to a data transfer state between the physical layer and the nonvolatile semiconductor memory according to the second standard.

17. The controller circuit according to claim 16, wherein the first standard is an I/O interface standard of PCIe (Peripheral Component Interconnect express), and the second standard is an interface standard of NVMe (Non-Volatile Memory express).

18. The controller circuit according to claim 16, wherein the physical layer includes at least one lane for input/output signals, a phase-locked loop (PLL) that generates a clock, a clock gating circuit that gates the clock, and a regulator that supplies a voltage to the lane, and the plurality of low power consumption modes are designated with at least one of an operating or stop state of the lane in the physical layer, an operating or stop state of the clock gating circuit, an operating or stop state of the PLL, and an operating or stop state of the regulator.

19. The controller circuit according to claim 16, further comprising:
  a multiplexer configured to select the low power consumption mode based on the data transfer state of the physical layer;
  a control circuit configured to determine a low power consumption state of the physical layer according to the selected low power consumption mode; and
  a generation circuit configured to generate a control signal for setting the determined low power consumption state.

20. The controller according to claim 19, wherein the physical layer includes at least one lane for input/output signals, a phase-locked loop (PLL) that generates a clock, a clock gating circuit that gates the clock, and a regulator that supplies a voltage to the lane, and the generation circuit is configured to generate a separate control signal for each of the lane for input/output signals, the PLL, the clock gating circuit, and the regulator.

* * * * *